No. 674,935. Patented May 28, 1901.
C. W. MEADOWCROFT.
PIPE COUPLING.
(Application filed Apr. 13, 1900.)
(No Model.)
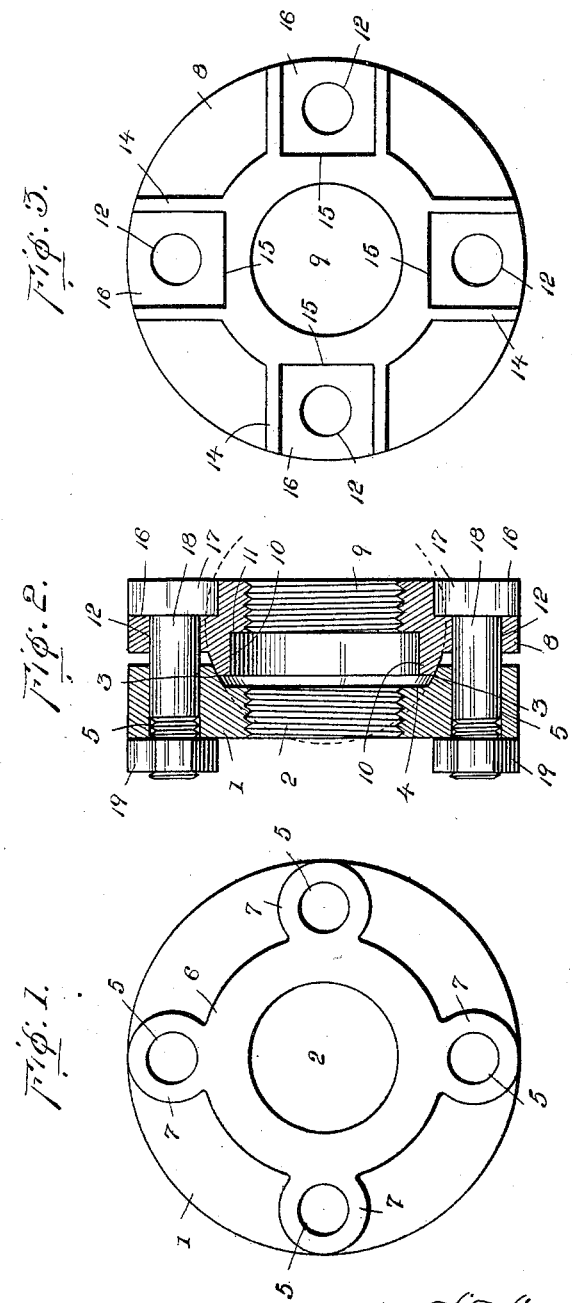
Witnesses
F. W. Riley,
Walter Allen
Inventor
C. W. Meadowcroft,
By Victor J. Evans.
Attorney
THE NORRIS PETERS CO., PHOTO-LITHO., WASHINGTON, D. C.

UNITED STATES PATENT OFFICE.

CHARLES W. MEADOWCROFT, OF PHILADELPHIA, PENNSYLVANIA.

PIPE-COUPLING.

SPECIFICATION forming part of Letters Patent No. 674,935, dated May 28, 1901.

Application filed April 13, 1900. Serial No. 12,746. (No model.)

*To all whom it may concern:*

Be it known that I, CHARLES W. MEADOWCROFT, a citizen of the United States, residing at Philadelphia, in the county of Philadelphia and State of Pennsylvania, have invented certain new and useful Improvements in Pipe-Couplings, of which the following is a specification.

My invention relates to new and useful improvements in couplings or joints for metallic pipes or tubes; and my primary object is to provide a device of simple construction and inexpensive in manufacture which may be easily connected, is capable of withstanding high pressure, and which accomplishes a tight joint without necessitating the use of bushing, packing, &c.

To these ends my improvement consists in the novel construction and combination of parts hereinafter fully described and claimed, and illustrated in the accompanying drawings, in which—

Figure 1 is an elevation of one member of my improved coupling, showing the outer face thereof. Fig. 2 is an axial section of the pipe-coupling. Fig. 3 is an elevation of the other member of the pipe-coupling, showing the outer face thereof.

1 and 8 are the two members of my coupling. One member, 1, is formed with a screw-threaded pipe-opening 2, a concave or flaring socket 3, an annular shoulder 4, intermediate of the screw-threaded pipe-opening and the concave or flaring socket, bolt-holes 5, and a circular strengthening-rib 6, surrounding the screw-threaded pipe-opening, and circular strengthening-ribs 7, surrounding the bolt-holes on the outer face of the member. The other member, 8, is formed with a screw-threaded pipe-opening 9, a convex or rounded head 10, fitting in the concave or flaring socket, an annular shoulder 11, intermediate of the screw-threaded pipe-opening 9 and the convex or rounded head 10, bolt-holes 12, and a circular rib 13, surrounding the screw-threaded pipe-opening 9, and parallel radial strengthening-ribs 14 on the outer face of this member 8, the parallel radial ribs 13, in connection with the straight outer walls 15 of the circular rib, providing squared sockets 16 for the squared heads 17 of the bolts 18, having nuts 19, whereby the members of the pipe-coupling are drawn together. The inner faces of the members 1 and 8 may be inclined, as indicated by dotted lines 20.

Having thus described my invention, the following is what I claim as new therein and desire to secure by Letters Patent:

A pipe-coupling comprising two members; one member being formed with a screw-threaded pipe-opening, a concave socket, an annular shoulder intermediate of the screw-threaded pipe-opening and the concave socket, bolt-holes, and a circular strengthening-rib surrounding the screw-threaded pipe-opening, and circular strengthening-ribs surrounding the bolt-holes on the outer face of the member, and the other member being formed with a screw-threaded pipe-opening, a convex head fitting in the concave socket, an annular shoulder intermediate of the screw-threaded pipe-opening and the convex head, bolt-holes and a circular strengthening-rib surrounding the screw-threaded pipe-opening and parallel radial strengthening-ribs on the outer face of the member, the parallel radial ribs in connection with the straight outer walls of the circular rib providing squared sockets for the squared heads of the bolts having nuts whereby the members are drawn together.

In testimony whereof I affix my signature in presence of two witnesses.

CHARLES W. MEADOWCROFT.

Witnesses:
  ALLAN J. CASSIDY,
  CHARLES WM. MEADOWCROFT, Jr.